US008710157B2

(12) United States Patent
Suzuki et al.

(10) Patent No.: US 8,710,157 B2
(45) Date of Patent: Apr. 29, 2014

(54) CONTACT LENS MATERIAL

(75) Inventors: Yasuhiko Suzuki, Nagoya (JP); Kazuhiko Nakada, Nagoya (JP); Tsuyoshi Watanabe, Nagoya (JP); Takahiro Adachi, Kamisu (JP); Mamoru Hagiwara, Annaka (JP); Masahiko Minemura, Annaka (JP)

(73) Assignees: Menicon Co., Ltd., Nagoya-shi (JP); Mitsubishi Gas Chemical Company, Inc., Tokyo (JP); Shin-Etsu Chemical Co., Ltd., Tokyo (JP)

( * ) Notice: Subject to any disclaimer, the term of this patent is extended or adjusted under 35 U.S.C. 154(b) by 161 days.

(21) Appl. No.: 13/383,983

(22) PCT Filed: Jul. 15, 2009

(86) PCT No.: PCT/JP2009/062796
§ 371 (c)(1),
(2), (4) Date: Jan. 13, 2012

(87) PCT Pub. No.: WO2011/007426
PCT Pub. Date: Jan. 20, 2011

(65) Prior Publication Data
US 2012/0116019 A1 May 10, 2012

(51) Int. Cl.
*C08F 283/02* (2006.01)
(52) U.S. Cl.
USPC .......................................................... 525/446
(58) Field of Classification Search
USPC ....................................................... 525/446
See application file for complete search history.

(56) References Cited

U.S. PATENT DOCUMENTS

| 2008/0153994 A1* | 6/2008 | Lens et al. .................... 525/446 |
| 2008/0306294 A1 | 12/2008 | Lens et al. |
| 2009/0012205 A1 | 1/2009 | Nakada et al. |

FOREIGN PATENT DOCUMENTS

| JP | 9-50144 | 2/1997 |
| JP | 2000-206721 | 7/2000 |
| JP | 2005-206699 A1 | 8/2005 |
| JP | 2006-199819 A1 | 8/2006 |

OTHER PUBLICATIONS

International Preliminary Report on Patentability dated Feb. 7, 2012, and a Notification of Transmittal of Translation of the International Preliminary Report on Patentability mailed Feb. 16, 2012, in counterpart International Application No. PCT/JP2009/062796.
International Search Report for International Application No. PCT/JP2009/062796 dated Sep. 8, 2009.
Supplementary European Search Report dated Dec. 10, 2012, in the corresponding European patent application No. 09847324.2.

\* cited by examiner

*Primary Examiner* — Margaret Moore
(74) *Attorney, Agent, or Firm* — Kratz, Quintos and Hanson, LLP

(57) ABSTRACT

According to the present invention, a contact lens material being excellent in oxygen permeability and transparency, being capable of undergoing injection molding, having no water content and having flexibility is provided. The present invention also relates to a contact lens gel material having excellent oxygen permeability and transparency. Particularly, the present invention relates to a contact lens material comprising a polycarbonate resin derived from a bisphenol compound (A), a polysiloxane-substituted bisphenol compound (B) and a compound forming a carbonic acid ester.

26 Claims, No Drawings

CONTACT LENS MATERIAL

TECHNICAL FIELD

The present invention relates to a contact lens material. More particularly, the present invention relates to a non-water containing and flexible contact lens material, comprised of a polycarbonate resin comprising diol in which a polysiloxane chain is introduced to the side chain thereof and a carbonate skeleton. Further, the present invention relates to a contact lens material comprised of a transparent gel which comprises the above polycarbonate resin and a hydrophilic polymer obtained by polymerizing a hydrophilic monomer and has an interpenetrating network structure of the resin and the hydrophilic polymer.

BACKGROUND ART

A contact lens is to be worn on a human eye in order to correct vision, and the development of a contact lens material having low double refraction, excellent oxygen permeability and moldability has been advanced. For example, in Patent Document 1, a contact lens material which is excellent in transparency and low in double refraction and has oxygen permeability is disclosed. Also, in Patent Document 2, a contact lens to which flexibility is given by forming a transparent gel is disclosed.

PRIOR ART DOCUMENT

Patent Documents

Patent Document 1: JP 2005-206699 A
Patent Document 2: JP 2006-199819 A

DISCLOSURE OF INVENTION

Problem to be Solved by the Invention

However, in the contact lens material described in Patent Document 1, in the case where a block copolymer containing a polysiloxane skeleton and a polycarbonate skeleton is used, there is a problem that the material becomes hard reflecting the rigidity of its main chain and thus the expected flexibility for the contact lens material cannot be obtained. Also, in the transparent gel and contact lens described in Patent Document 2, while a measure of flexibility arises due to the material being in the form of gel, there is a problem that the flexibility to such a degree that a wearing comfortableness can be obtained cannot be given.

It is an object of the present invention to provide a contact lens material being excellent in oxygen permeability and transparency, being capable of undergoing injection molding, having no water content and having flexibility, as well as to provide a contact lens gel material having excellent oxygen permeability and transparency. The "contact lens material" stated herein can be used as an artificial cornea which is placed inside of the body, or as a corneal onlay or a corneal inlay. Thus, the present invention provides a contact lens material within a broad range including the above-mentioned applications, and is not limited to a so-called contact lens.

Means to Solve the Problem

By introducing a flexible polysiloxane chain into the side chain but not into the main chain (graft type), the formed polymer has few bonding sites due to the bulkiness of the polysiloxane chain and so the flexibility of the molecular chain is not spoiled. As a result, flexibility of the material can be obtained while transparency and oxygen permeability thereof are maintained.

Further, flexibility of the material can be also obtained while transparency and oxygen permeability thereof are maintained, by using a polycarbonate resin in which the block type having the polysiloxane chain as a main chain and the graft type having the polysiloxane chain as a side chain are jointly induced.

In other words, the present invention is a contact lens material comprising a polycarbonate resin derived from a compound represented by the general formula (A), a compound represented by the general formula (B) and a compound forming a carbonic acid ester.

[Chemical formula 1]

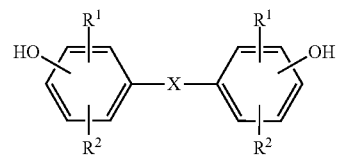

(A)

wherein each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 2]

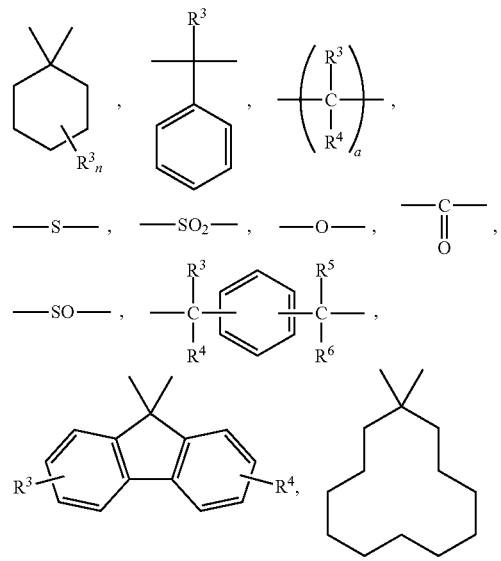

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4.

[Chemical formula 3]

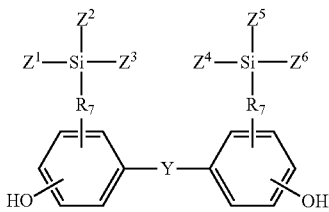

(B)

wherein $R^7$ is an aliphatic group of C1 to C6 or only denotes a bond, Y is a group shown by the formula:

[Chemical formula 4]

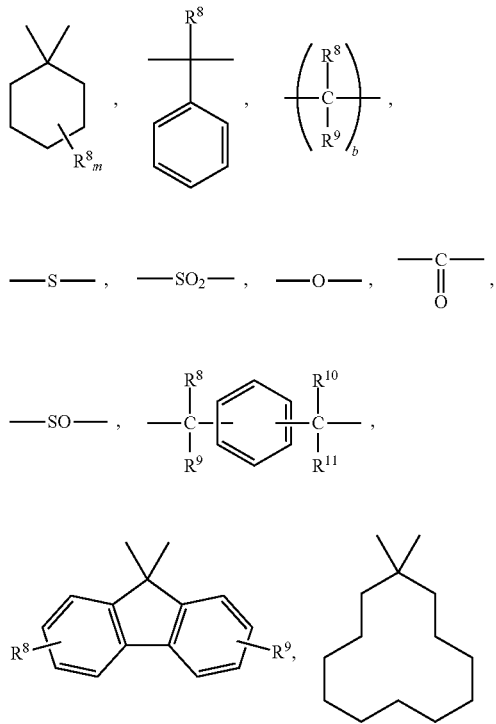

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 5]

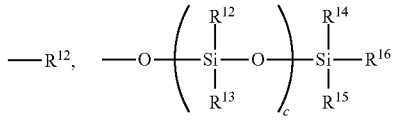

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, preferably each of $R^{12}$ to $R^{16}$ is a methyl group, a phenyl group or a butyl group, c is an integer of 0 to 100.

Moreover, the present invention is a contact lens material comprising a polycarbonate resin derived from a compound represented by the general formula (A), a compound represented by the general formula (B), a compound represented by the general formula (c) and a compound forming a carbonic acid ester.

[Chemical formula 6]

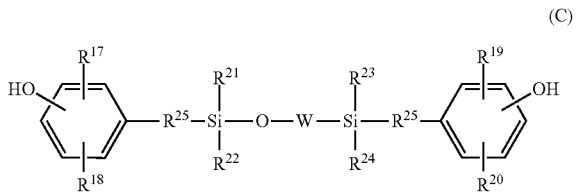

(C)

wherein each of $R^{17}$ to $R^{24}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5. $R^{25}$ is an aliphatic group of C1 to C6 or only denotes a bond. W is a homopolymer or a random copolymer of $-SiO(R^{26})(R^{27})-$ and/or $-SiO(R^{28})(R^{29})-$ and a degree of polymerization thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5.

The present invention is also a contact lens material comprising a transparent gel comprising a polycarbonate resin and a hydrophilic polymer obtained by polymerizing a hydrophilic monomer, wherein the polycarbonate resin is derived from a compound represented by the general formula (A), a compound represented by the general formula (B) and a compound forming a carbonic acid ester, and wherein the transparent gel has an interpenetrating network structure of the resin and the hydrophilic polymer.

The present invention is also a contact lens material comprising a transparent gel comprising a polycarbonate resin and a hydrophilic polymer obtained by polymerizing a hydrophilic monomer, wherein the polycarbonate resin is derived from a compound represented by the general formula (A), a compound represented by the general formula (B), further a compound represented by the general formula (C) and a compound forming a carbonic acid ester, and wherein the transparent gel has an interpenetrating network structure of the resin and the hydrophilic polymer.

The compound represented by the general formula (A) is preferably at least one selected from the group consisting of 9,9-bis(4-hydroxyphenyl)fluorene, 9,9-bis(4-hydroxy-3-methylphenyl)fluorene, 9,9-bis(4-hydroxy-2-methylphenyl) fluorene, 2,2-bis(4-hydroxyphenyl)-2-phenylethane, 1,1-bis (4-hydroxyphenyl)cyclohexane, 1,1-bis(4-hydroxy-3-methylphenyl)cyclohexane, 1,1-bis(4-hydroxyphenyl)cyclododecane and 3,3,5-trimethyl-1,1-bis(4-hydroxyphenyl) cyclohexane.

Each of $R^{12}$ to $R^{16}$ in the general formula (B) is preferably a methyl group, a phenyl group or a butyl group.

The compound represented by the general formula (B) is preferably at least one selected from a compound represented by the general formula (B1) and a compound represented by the general formula (B2).

[Chemical formula 7]

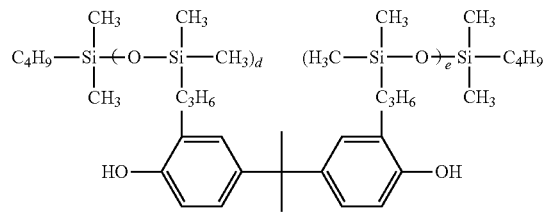

(B1)

wherein each of d and e is an integer of 0 to 100.

[Chemical formula 8]

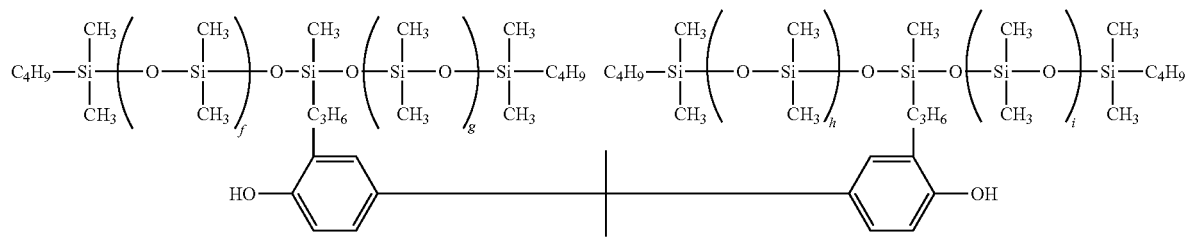

(B2)

wherein each of f, g, h and i is an integer of 0 to 100.

The above hydrophilic monomer is preferably a monomer having a nitrogen atom.

The above monomer having a nitrogen atom is preferably N-vinyl pyrrolidone, N,N-dimethylacrylamide and/or N-methyl-3-methylidene pyrrolidone.

It is preferable that a ratio of the compound represented by the general formula (A) to the compound represented by the general formula (B) is (A):(B)=25:75 to 75:25 by weight.

It is preferable that a ratio of the compound represented by the general formula (A) to the compounds represented by the general formulas (B) and (C) is (A):(B+C)=25:75 to 75:25 by weight.

It is preferable that a ratio of the above polycarbonate resin to the above hydrophilic monomer is 5:95 to 40:60 by weight.

Effect of the Invention

According to the contact lens material of the present invention, a contact lens material being excellent in oxygen permeability and transparency, being capable of undergoing injection molding, having no water content and having flexibility can be provided. In addition, the present invention can provide a contact lens gel material having excellent oxygen permeability and transparency.

EMBODIMENT FOR CARRYING OUT THE INVENTION

Embodiment 1

The present invention is a contact lens material comprising a polycarbonate resin derived from a compound represented by the general formula (A), a compound represented by the general formula (B) and a compound forming a carbonic acid ester.

The compound containing a polycarbonate structure is not specifically limited and an example thereof is the compound represented by the following general formula (A).

[Chemical formula 9]

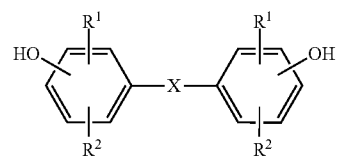

(A)

wherein each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 10]

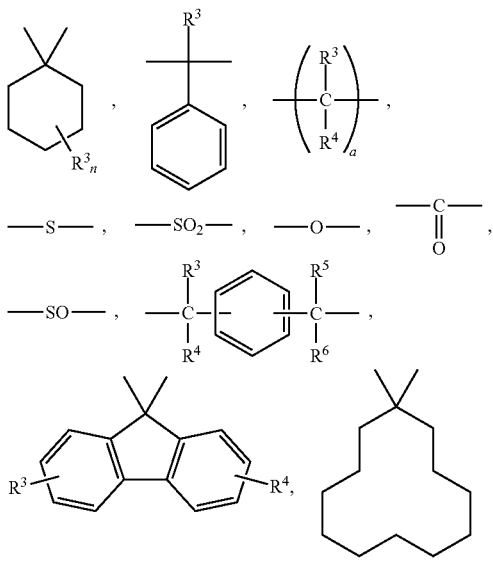

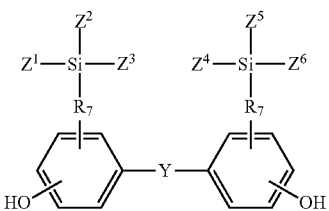

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4.

Examples of the compound (A) are specifically 9,9-bis(4-hydroxyphenyl)fluorene, 9,9-bis(4-hydroxy-3-methylphenyl)fluorene, 9,9-bis(4-hydroxy-2-methylphenyl)fluorene, 4,4-biphenyldiol, bis(4-hydroxyphenyl)methane, bis(4-hydroxyphenyl)ether, bis(4-hydroxyphenyl)sulfone, bis(4-hydroxy-3-methylphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A; BPA), 2,2-bis(4-hydroxyphenyl)butane, 1,1-bis(4-hydroxyphenyl)cyclohexane (bisphenol Z; BPZ), 1,1-bis(4-hydroxy-3-methylphenyl)cyclohexane, 1,1-bis(4-hydroxyphenyl)cyclododecane, 2,2-bis(4-hydroxy-3-methylphenyl)propane (dimethylbisphenol A), 2,2-bis(4-hydroxy-3,5-dimethylphenyl)propane, 1,1-bis(4-hydroxyphenyl)-1-phenylethane (bisphenol AP; BPAP), bis(4-hydroxyphenyl)diphenylmethane, 2,2-bis(4-hydroxy-3-allylphenyl)propane, 3,3,5-trimethyl-1,1-bis(4-hydroxyphenyl)cyclohexane, 3,6-dimethyl-9,9-bis(4-hydroxyphenyl)fluorene, 9,9-bis(3-methoxy-4-hydroxyphenyl)fluorene, 9,9-bis(3-ethoxy-4-hydroxyphenyl)fluorene, 9,9-bis(3-ethyl-4-hydroxyphenyl)fluorene, 4,5-dimethyl-9,9-bis(4-hydroxyphenyl)fluorene, 9,9-bis(3-phenyl-4-hydroxyphenyl)fluorene, 3,6-dimethyl-9,9-bis(3-methyl-4-hydroxyphenyl)fluorene, and 3,6-diphenyl-9,9-bis(4-hydroxyphenyl)fluorene. Among them, at least one selected from the group consisting of 9,9-bis(4-hydroxyphenyl)fluorene, 9,9-bis(4-hydroxy-3-methylphenyl)fluorene, 9,9-bis(4-hydroxy-2-methylphenyl)fluorene, 1-bis(4-hydroxyphenyl)cyclohexane (bisphenol Z; BPZ), 1,1-bis(4-hydroxy-3-methylphenyl)cyclohexane, 1,1-bis(4-hydroxyphenyl)cyclododecane, 1,1-bis(4-hydroxyphenyl)-1-phenylethane (bisphenol AP; BPAP), and 3,3,5-trimethyl-1,1-bis(4-hydroxyphenyl)cyclohexane is particularly preferable in view of their good reactivity and producibility in an industrial scale and easy availability. They can be used in combination of two or more thereof.

The compound forming a polysiloxane structure is not specifically limited and an example thereof is the compound represented by the following general formula (B).

[Chemical formula 11]

(B)

$$Z^1-\underset{\underset{R_7}{|}}{Si}-Z^3 \quad Z^4-\underset{\underset{R_7}{|}}{Si}-Z^6$$

[diagram: HO—phenyl—Y—phenyl—OH, with $Z^2$ and $Z^5$ labels]

wherein $R^7$ is an aliphatic group of C1 to C6 or only denotes a bond, Y is a group shown by the formula:

[Chemical formula 12]

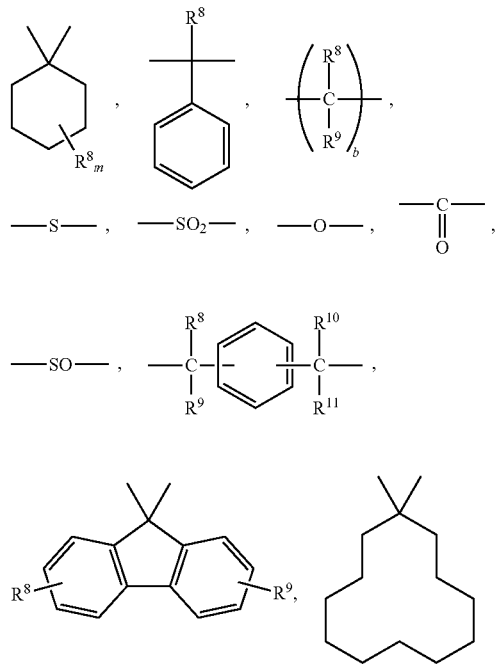

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 13]

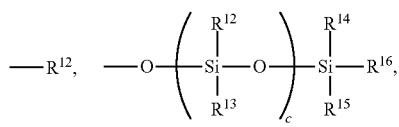

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, preferably, each of $R^{12}$ to $R^{16}$ is selected from a methyl group, a phenyl group and a butyl group, c is an integer of 0 to 100.

Specific examples of the compound (B) is a compound wherein each of $R^{12}$ to $R^{16}$ is a methyl group or a phenyl group, more specifically at least one selected from 2,2-bis(4-hydroxy-3-polydimethylsiloxypropylphenyl)propane represented by the formula (B1) or the compound represented by the general formula (B2).

[Chemical formula 14]

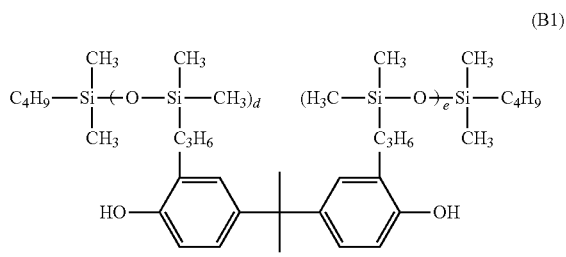

(B1)

wherein each of d and e is an integer of 0 to 100;

[Chemical formula 15]

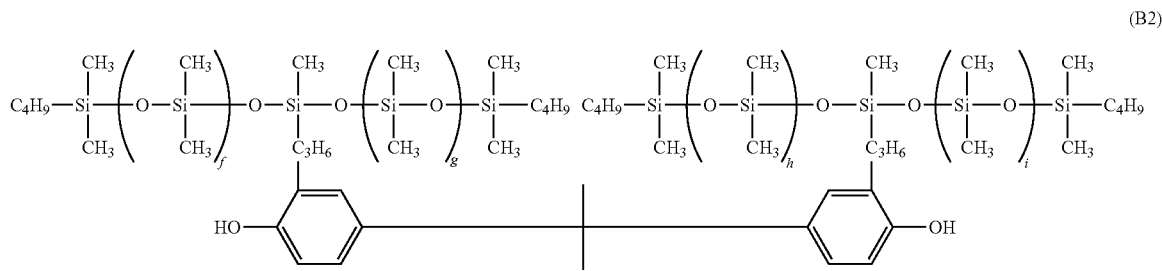

(B2)

wherein each of f, g, h and i is an integer of 0 to 100. Among them, a compound of (B1) wherein d=e=10, and a compound of (B2) wherein f=g=h=i=10 are preferable in view of their good reactivity and producibility in an industrial scale and easy availability. These compounds can be used in combination of two or more thereof.

A ratio of the polysiloxane structure and the polycarbonate structure in copolymer is preferably 25:75 to 75:25 by weight, more preferably 40:60 to 70:30 by weight. When the polysiloxane structure is less than 25 wt % and the polycarbonate is more than 75 wt %, rigidity tends to be in excess for the use for a soft contact lens, and also the desired oxygen permeability tends to be unobtainable for the use for a contact lens material. When the polysiloxane structure is more than 75 wt % and the polycarbonate structure is less than 25 wt %, strength tends to be decreased.

The copolymer having the polysiloxane structure and the polycarbonate structure is derived, for example, from the compound (A) and the compound (B) and a compound forming a carbonic acid ester.

Examples of the compound forming a carbonic acid ester are phosgene, bis-aryl carbonates such as diphenyl carbonate, di-p-tolylcarbonate, phenyl-p-tolylcarbonate, di-p-chlorophenylcarbonate and dinaphthylcarbonate, and the like. Those compounds can be used in combination of two or more thereof. Among them, phosgene and diphenyl carbonate are particularly preferable from the viewpoint of good reactivity and producibility at a low cost.

The amount of the compound forming a carbonic acid ester to be used is 1.0 to 2.0 mole, preferably 1.2 to 1.5 mole per one mole of the total bisphenols. When the amount of the compound forming a carbonic acid ester to be used is less than 1.0 mole, the molecular weight cannot be increased up to the desired molecular weight and thus no polymer can be formed, and when it is more than 2.0 mole, the compound forming a carbonic acid ester which is not used in polymerization remains in the polymer, whereby a bad influence tends to be given to the quality of the polymer.

As a method for producing the copolymer by reacting the above compound (A) and the above compound (B) with the compound forming a carbonic acid ester, a known method for producing a polycarbonate derived from a bisphenol A can be adopted. For instance, a direct reaction of a bisphenol compound and phosgene (a phosgene method), an ester exchange reaction (an transesterification method) of a bisphenol compound and a bis-aryl carbonate, or the like can be adopted. Comparing the phosgene method with the transesterification method, the former is preferable from the viewpoint of the reactivity of the compound (A) and the compound (B).

In the phosgene method, generally, the compound (A) and the compound (B) are reacted with phosgene in the presence of an acid coupling agent and a solvent. As the acid coupling agent, for example, pyridine and alkaline metal hydroxides such as sodium hydroxide and potassium hydroxide are used. As the solvent, for example, dichloromethane, chloroform, chlorobenzene, xylene and the like are used. Further, in order to accelerate condensation polymerization reaction, a tertiary amine catalyst such as triethylamine can be used, and in order to control a degree of polymerization, a monofunctional compound such as phenol, p-tert-butylphenol, p-cumylphenol, an alkyl-substituted phenol, alkyl hydroxybenzate, alkyloxyphenol or the like can be added as a molecular weight control modifier. Further, if necessary, an anti-oxidant such as sodium sulfite or sodium hydrosulfite, and a branching agent such as phloroglucin, isatin bisphenol, 1,1,1-tris(4-hydroxyphenyl)ethane, or α,α',α"-tris(4-hydroxyphenyl)-1,3,5-triisopropyl benzene may be added in a small amount. The reaction temperature is generally 0-150° C., preferably 5-40° C. The reaction time depends upon the reaction temperature, and is generally 0.5 minutes to 10 hours, preferably 1 minute to 2 hours. Further, pH in the reaction system is desirably kept at 10 or more during the reaction.

On the other hand, in the transesterification method, the compound (A) and the compound (B) in the present invention are mixed with a bis-aryl carbonate and reacted with each other under reduced pressure at a high temperature. In this step, a monofunctional compound such as p-tert-butylphenol, p-cumylphenol, an alkyl-substituted phenol, alkyl hydroxybenzate, alkyloxyphenol or the like may be added as a molecular weight control modifier. Further, in case of necessity, an anti-oxidant and a branching agent may be added. The reaction is conducted generally at 150-350° C., preferably 200-300° C., and phenols originated from the above-mentioned bis-aryl carbonates and produced by the ester exchange reaction are distilled off from the reaction system by reducing the pressure preferably finally down to 1 mmHg or lower. The reaction time depends upon the reaction temperature and a degree of reduced pressure, and is generally about 1 to 10 hours. The reaction is preferably conducted under atmosphere of an inert gas such as nitrogen or argon.

In the case of adopting the phosgene method in the present invention, it is possible to blow phosgene in the presence of a quaternary ammonium salt in order to conduct the reaction efficiently. Specific examples of the quaternary ammonium salt are tetramethyl ammonium chloride, trimethylbenzyl ammonium chloride, triethylbenzyl ammonium chloride, tetraethyl ammonium bromide, tetra-n-butyl ammonium iodide, etc., and among them, trimethylbenzyl ammonium chloride and triethylbenzyl ammonium chloride are preferable. The quaternary ammonium salt is preferably used in an amount of generally 0.0005-5 mole % relative to the total bisphenols used.

Further, in the case of using a molecular weight control modifier, a monohydric phenol is preferable and particular examples thereof are, phenol and an alkyl-substituted phenols such as butyl phenol, octyl phenol, nonyl phenol, decanyl phenol, tetradecanyl phenol, heptadecanyl phenol or octadecanyl phenol; an alkyl hydroxybenzoate such as butyl hydroxybenzoate, octyl hydroxybenzoate, nonyl hydroxybenzoate, decanyl hydroxybenzoate or heptadecanyl hydroxybenzoate; and an alkyloxyphenol such as butoxyphenol, octyloxyphenol, nonyloxyphenol, decanyloxyphenol, tetradecanyloxyphenol, heptadecanyloxyphenol or octadecanyloxyphenol. The amount of these molecular weight control modifiers to be used is 0.1-50 mole %, preferably 0.5-10 mole % relative to the total bisphenols.

The intrinsic viscosity of the contact lens material of the present invention (polycarbonate resin) is preferably within a range of 0.1-1.0 dL/g. Particularly, in the case where a high cycle molding is required, the preferable range is 0.13-0.6 dL/g, and more preferable range is 0.15-0.4 dL/g. When it is less than 0.1 dL/g, mold release failure and warping tend to occur, and when it is more than 1.0 dL/g, fluidity is poor and thus insufficient filling into a mold and generation of a flow mark tend to occur.

When producing the contact lens material of the present invention, high grade purification is preferred as in a conventional polycarbonate resin for an optical disk. Specifically, the purification is carried out so as to comply as much as possible with such criteria that substantially no dust having a diameter of not less than 50 μm is found, the number of dusts having a diameter of 0.5-50 μm is not more than $3\times10^4$, an inorganic and organic residual chlorine content is not more than 2 ppm, a residual alkaline metal content is not more than 2 ppm, a residual hydroxyl group content is not more than 200 ppm, a residual nitrogen content is not more than 5 ppm, a residual monomer content is not more than 20 ppm, etc. Further, in order to remove a low molecular product and a solvent, a post-treatment such as extraction can sometimes be conducted. Also, regarding the starting materials such as the compound (A), the compound (B) and the compound forming a carbonic acid ester, those from which impurities and isomers were reduced as much as possible are preferably used.

When producing the contact lens of the present invention, according to necessity for keeping stability and releasability, a hindered phenol type and phosphite type antioxidant; a lubricating agent and a releasing agent such as a silicone, a fatty acid ester, a fatty acid, a fatty acid glyceride and a natural oil and fat such as bees wax; a benzotriazole type, a benzophenone type, a dibenzoyl methane type and a salicylate type photo stabilizer; an antistatic agent such as a polyalkylene glycol and a fatty acid glyceride may be optionally added.

For the purpose of the reduction in cost and recycling, it is further possible to use a conventional bisphenol A type polycarbonate optionally to such an extent not to impair the performance of the contact lens. In addition to the above physical properties as a molding material, it is specifically desirable for getting a clear visual acuity in contact lens that a double refraction of a 30° slant incident light is not higher than 50 nm, preferably not higher than 25 nm, and a visible light transmittance is at least not less than 60%, preferably not less than 90%. With respect to the property of the contact lens material, in order to assure safety in wearing a contact lens, oxygen permeability is desirably not less than $50\times10^{-11}$ (cm$^2$/sec)·(mLO$_2$/(mL·mmHg)), further not less than $70\times10^{-11}$ (cm$^2$/sec)·(mLO$_2$/(mL·mmHg)) for continuous use.

In the case of producing a contact lens from the contact lens material of the present invention, the contact lens material is molded into a lens blanks having a button shape of a 10-15 mm outer diameter and a 2-5 mm thickness, and then the molded article is processed to a lens by a conventional lathing method, a photo processing with laser or the like. As the contact lens material of the present invention is excellent in moldability and low in double refraction, molding into a shape similar to a lens is also possible. In this process, a flanged portion may be provided on a periphery of the lens for processing. In any case, it is necessary to produce a molded article having molding distortion inhibited as much as possible and not to use a part accompanied with distortion as a contact lens. Further, the contact lens material can be subjected to a plasma treatment or a glow discharge treatment under atmospheric or reduced pressure in order to improve surface wettability. Still further, a graft polymerization may be conducted.

A contact lens material according to Embodiment 1 of the present invention can be used for RGP (Rigid Gas Permeable) lens.

In the case of producing a contact lens from the contact lens material of the present invention, a polycarbonate resin is molded into a lens blanks having a button shape of a 10-15 mm outer diameter and a 2-5 mm thickness, and then the molded article is processed to a lens by a conventional lathing method, a photo processing with laser or the like. As the polycarbonate resin of the present invention is excellent in moldability and low in double refraction, molding into a shape similar to a lens is also possible. In this process, a flanged portion may be provided on a periphery of the lens for processing. In any case, it is necessary to produce a molded article having molding distortion inhibited as much as possible and not to use a part accompanied with distortion as a contact lens. Further, the contact lens comprising of the polycarbonate resin can be subjected to a plasma treatment or a glow discharge treatment under atomospheric or reduced pressure in order to improve surface wettability. Still further, a surface treatment such as a graft polymerization may be conducted.

Embodiment 2

Moreover, the present invention is a contact lens material comprising a polycarbonate resin derived from a compound represented by the general formula (A), a compound represented by the general formula (B), a compound represented by the general formula (c) and a compound forming a carbonic acid ester.

[Chemical formula 16]

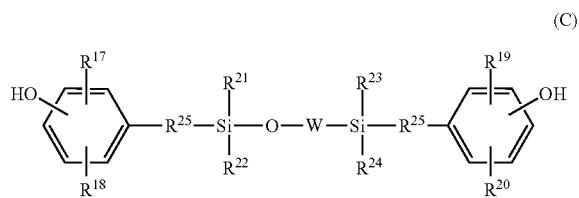

(C)

wherein each of $R^{17}$ to $R^{24}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5. $R^{25}$ is an aliphatic group of C1 to C6 or only denotes a bond. W is a homopolymer or a random copolymer of —SiO($R^{26}$)($R^{27}$)— and/or —SiO($R^{28}$)($R^{29}$)— and a degree of polymerization thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5.

The polymerization degree of W moiety is 0 to 200, preferably 10 to 150. When the polymerization degree is more than 200, transparency and strength tend to be decreased.

Each of $R^{21}$ to $R^{24}$ in the general formula (C) is preferably a methyl group or a phenyl group for maintaining oxygen permeability and refraction index.

Examples of the compound represented by the general formula (C) are specifically those shown by the following structural formulas.

[Chemical formula 17]

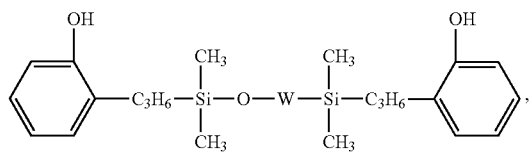

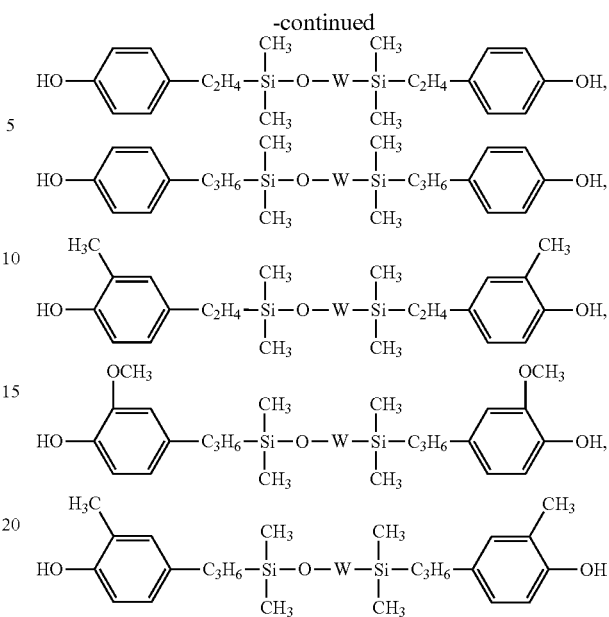

wherein W is one comprising a plurality of the following bocks randomly bound.

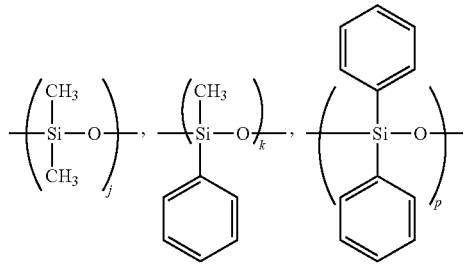

wherein j≥0, k≥0, p≥0, 200≥(j+k+p)≥0.

The compounds represented by the general formula (C) can be used in combination of two or more thereof. Preferably, W is in particular a homopolymer or a random copolymer comprising 1 to 100 moieties of dimethylsiloxane and/or diphenylsiloxane. Among them, particularly a random copolymer of dimethylsiloxane having 3-(o-hydroxyphenyl) propyl group in α and ω positions and diphenylsiloxane, or (α,ω-bis[3-(o-hydroxyphenyl)propyl]polydimethylsiloxane) is preferable in view of oxygen permeability, refraction index and transparency.

A ratio of the polysiloxane structure to the polycarbonate structure in the copolymer, in other words, a ratio of the compound represented by the general formula (A) to the compounds represented by the general formulas (B) and (C) is preferably (A):(B+C)=25:75 to 75:25, more preferably 40:60 to 70:30 by weight. When the polysiloxane structure is less than 25 wt % and the polycarbonate is more than 75 wt %, rigidity tends to be in excess for the use as a soft contact lens, and also the desired oxygen permeability tends to be unobtainable for the use as a contact lens material. When the polysiloxane structure is more than 75 wt % and the polycarbonate is less than 25 wt %, strength tends to be decreased.

The compound represented by the general formula (A), the compound represented by the general formula (B) and the compound forming a carbonic acid ester are the same as those in Embodiment 1 and therefore their explanations are left out.

Moreover, the polycarbonate resin according to Embodiment 2 can be also used as a RGP (Rigid Gas Permeable) lens. The usage of this polycarbonate resin as a contact lens material is also the same as that in Embodiment 1 and therefore the explanation thereof is left out.

Embodiment 3

The present invention is also a contact lens material comprising a transparent gel comprising a polycarbonate resin and hydrophilic polymer obtained by polymerizing a hydrophilic monomer, wherein the polycarbonate resin is derived from a compound represented by the general formula (A), a compound represented by the general formula (B) and a compound forming a carbonic acid ester, and wherein the transparent gel has an interpenetrating network structure of the resin and the hydrophilic polymer.

The term of "transparency" in the present invention means visible light transmittance (% T) is 60% or more. Also, the interpenetrating network structure means such a structure that the resin and the hydrophilic polymer are forming the network basket, whereby it becomes possible to supply oxygen to eye through the apertures thereof.

The compound represented by the general formula (A) and the compound represented by the general formula (B) are the same as those in Embodiments 1 and 2 and therefore their explanations are left out.

The hydrophilic monomer used in the present invention is not specifically limited and examples thereof are monomers having a nitrogen atom such as N-vinyl pyrrolidone, N,N-dimethylacrylamide and N-methyl-3-methylidene pyrrolidone, mathacrylic acid, hydroxyethyl(meth)acrylate and the like. Among them, a monomer having a nitrogen atom, particularly N-vinyl pyrrolidone, N,N-dimethylacrylamide and N-methyl-3-methylidene pyrrolidone are preferable in view of prevention of white turbidity by suppressing phase-separation structure during polymerization. Those hydrophilic monomers can be used in combination of two or more thereof.

In the present invention, a ratio of the polycarbonate resin to the hydrophilic monomer is preferably 5:95 to 40:60 by weight, more preferably 10:90 to 30:70 by weight. When the polycarbonate resin is less than 5 wt % and the hydrophilic monomer is more than 95 wt %, the effect of the present invention by the polycarbonate resin tends to be unobtainable. Further, mixing the polycarbonate resin with the hydrophilic monomer increases viscosity, and thus when the polycarbonate resin is more than 40 wt % and the hydrophilic monomer is less than 60 wt %, the resultant tends to be rigid even though transparency and oxygen permeability are satisfactory.

A crosslinking agent may be added to the mixture obtained by dissolving the polycarbonate resin in the hydrophilic monomer in order to give a reinforcing effect. As the crosslinking agent, a conventional one can be used, and ethylene glycol di(meth)acrylate, allyl methacrylate and diethylene glycol diallyl ether are preferable because of an effect of increasing transparency of the obtained material. Those can be used alone or in combination of two or more thereof. When the crosslinking agent is used, the amount thereof is preferably not less than 0.1 wt % relative to the whole mixture for the purpose of exhibiting desired reinforcing effect, preferably not more than 10 wt % for the purpose of preventing stretch as hydrogel from reducing and rigidness thereof from increasing too much. In the mixture, there may be further incorporated a silicone-containing monomer other than the compound (B) and a solvent. Examples of the solvent are tetrahydrofuran, isopropanol, acetone, hexane and the like.

Furthermore, a polymerizable or non-polymerizable ultraviolet absorbent, a polymerizable dyestuff and a polymerizable ultraviolet absorbing dyestuff can be used as a component for providing the contact lens material with ultraviolet absorbing property or for coloring the material.

In the present invention, the above polycarbonate resin has no polymerizable group, and thus shrinkage in its volume caused by polymerization can be suppressed. Therefore, satisfactory polymerization can be conducted even in a resin mold. For the polymerization, a conventional polymerization initiator such as a heat polymerization initiator or a photo polymerization initiator is used.

In the case of producing a hydrogel from the polycarbonate resin of the present invention, similarly to Embodiment 1, a composition containing the polycarbonate resin is hardened to a lens blanks having a button shape of 10-15 mm outer diameter and 2-5 mm thickness, and then the resultant is processed to a lens by a conventional lathing method, a photo processing with laser or the like. As the polycarbonate resin of the present invention is excellent in moldability and low in double refraction, molding of the composition containing the polycarbonate resin into a shape similar to a lens is also possible. In this process, a flanged portion may be provided on a periphery of the lens for processing. In any case, it is necessary to produce a molded article having molding distortion inhibited as much as possible and not to use a part accompanied with distortion as a contact lens. Further, a contact lens comprising the polycarbonate resin can be subjected to a plasma treatment or a glow discharge treatment under atmospheric or reduced pressure in order to improve surface wettability. Still further, a graft polymerization may be conducted.

Embodiment 4

The present invention is also a contact lens material comprising a transparent gel comprising a polycarbonate resin and a hydrophilic polymer obtained by polymerizing a hydrophilic monomer, wherein the polycarbonate resin is derived from a compound represented by the general formula (A), a compound represented by the general formula (B), further a compound represented by the general formula (C) and a compound forming a carbonic acid ester, and wherein the transparent gel has an interpenetrating network structure of the resin and the hydrophilic polymer, The compound represented by the general formula (A), the compound represented by the general formula (B), the compound represented by the general formula (C), a compound forming a carbonic acid ester and the hydrophilic monomer are the same as those in Embodiments 1 to 3 and therefore their explanations are left out. Additionally, the usage of this polycarbonate as a contact lens material is also the same as that in Embodiment 3 and therefore the explanation thereof is left out.

Synthesis Example 1

In 450 mL of a 7.9% (w/w) aqueous solution of sodium hydroxide were dissolved 48.8 g of 1,1-bis(4-hydroxyphenyl)cyclohexane (hereinafter referred to as BPZ), 73.2 g of the polyorganosiloxane compound having the following structure [chemical formula 18], and 0.1 g of sodium hydrosulfite. Thereto was added 350 mL of methylene chloride and 32.0 g of phosgene was blown at 1.28 g/min with agitating at 20° C. After the blowing is complete, 3.8 g of dodecyl p-hydroxybenzoate (hereinafter referred to as POB-C12) and 100 mL of a 7.9% (w/w) aqueous solution of sodium hydroxide were added thereto, followed by vigorous agitation for 10 minutes, and 0.4 mL of triethylamine was further added and the resulting mixture was agitated for 40 minutes to conduct polymerization.

[Chemical formula 18]

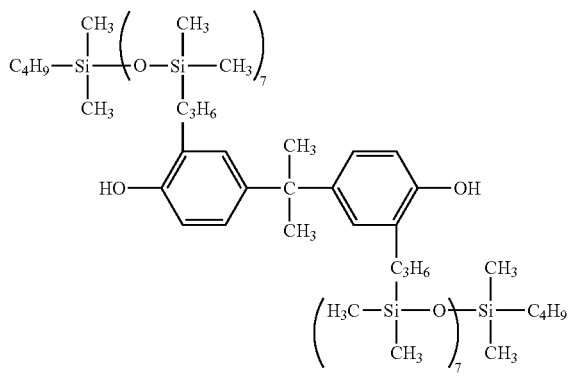

The polymer liquid was separated into an aqueous phase and an organic phase, and the organic phase was neutralized by using phosphoric acid, and washed with water repeatedly until an electrical conductivity of the water reached 10 μS/cm or lower, whereby a purified resin solution was obtained. The purified resin solution obtained was dropped slowly into warm water of 65° C. under vigorous agitation, and a solvent was removed, whereby the polymer was solidified. The solid was filtrated, and dried to give a white powdery polymer. This polymer had an intrinsic viscosity [η] of 0.28 dL/g at 20° C. in the methylene chloride solution of this polymer having the concentration of 0.5 g/dL. As the result of infrared absorption spectrum analysis, it was shown that the obtained polymer had absorption in the vicinity of 1770 cm$^{-1}$ originated from a carbonyl group, and absorption in the vicinity of 1240 cm$^{-1}$ originated from an ether bond, whereby the polymer was confirmed to have a carbonate bond. And it was shown that the polymer barely had absorption originated from a hydroxyl group in the vicinity of 3650-3200 cm$^{-1}$. As the result of GPC analysis, any of monomers in this polymer was 20 ppm or less. Considering all the various factors together, this polymer was confirmed as a polycarbonate polymer having the following structure unit.

[Chemical formula 19]

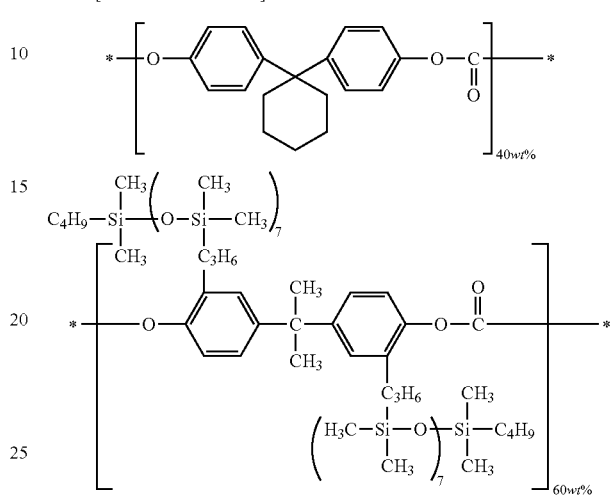

Synthesis Example 2

A polymer was synthesized in the same manner as in Example 1, except that 48.8 g of the polyorganosiloxane compound having the following structure [chemical formula 20] was used instead of the polyorganosiloxane compound having the structure of [chemical formula 18] and the amount of Phosgene was changed to 29 g, and the amount of POB-C12 was changed to 3.0 g. The intrinsic viscosity [η] of the obtained polymer was 0.22 dL/g, and as the result of infrared absorption spectrum analysis and others, this polymer was confirmed as a polycarbonate polymer having the following structure unit.

[Chemical formula 20]

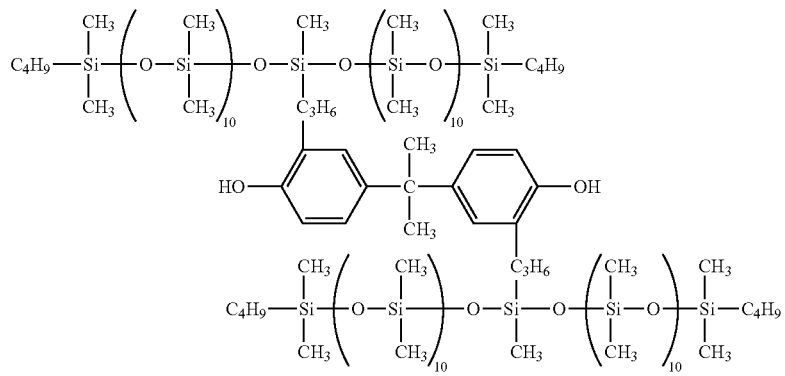

[Chemical formula 21]

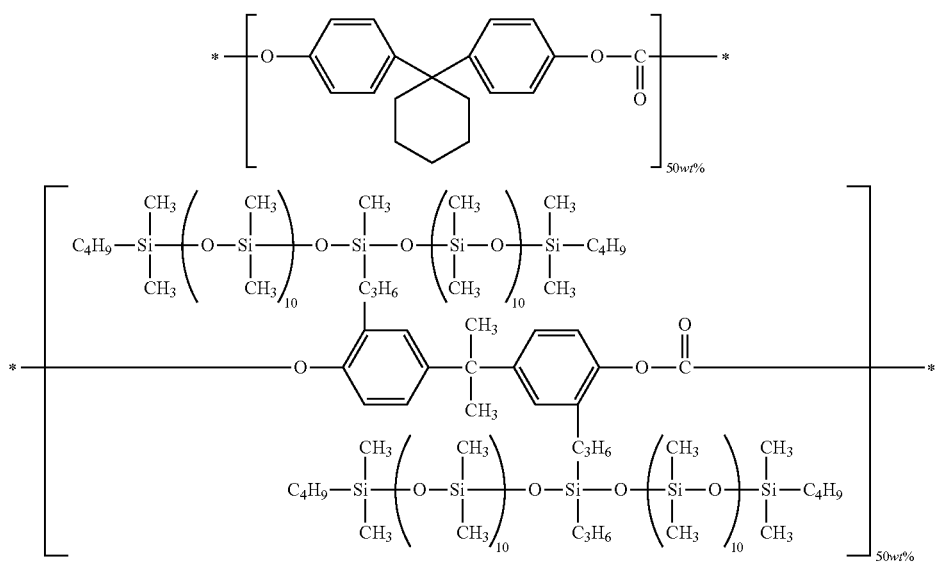

Synthesis Example 3

A polymer was synthesized in the same manner as in Example 1, except that 24.4 g of the polyorganosiloxane compound having the following structure [chemical formula 22] and 24.4 g of the polyorganosiloxane compound having the following structure [chemical formula 23] were used instead of the polyorganosiloxane compound having the structure of [chemical formula 18], and the amount of Phosgene was changed to 30 g, and the amount of POB-C12 was changed to 3.1 g. The intrinsic viscosity [η] of the obtained polymer was 0.33 dL/g, and as the result of infrared absorption spectrum analysis and others, this polymer was confirmed as a polycarbonate polymer having the following structure unit.

[Chemical formula 22]

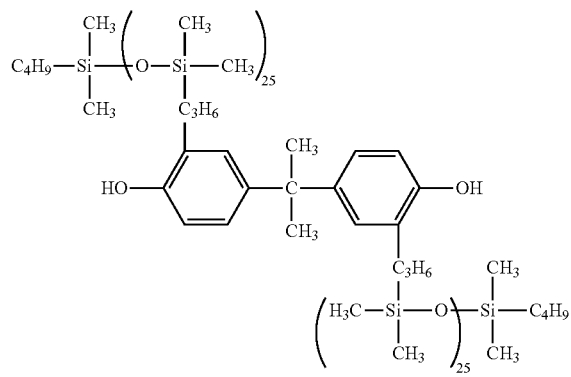

[Chemical formula 23]

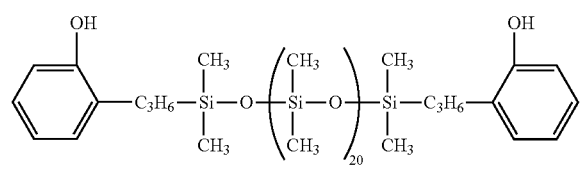

[Chemical formula 24]

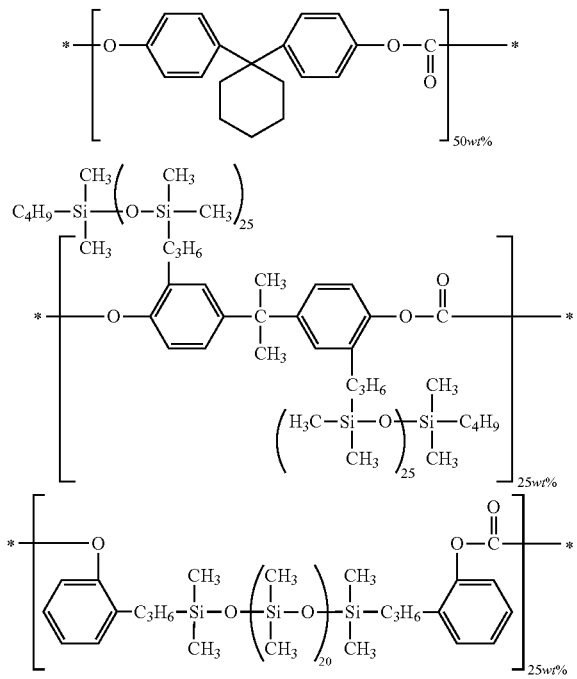

Synthesis Example 4

A polymer was synthesized in the same manner as in Example 1, except that the polyorganosiloxane compound having the structure of [chemical formula 18] was not added into 620 mL of a 7.9% (w/w) aqueous solution of sodium hydroxide, and the amount of BPZ was changed to 96.5 g, the amount of Phosgene was changed to 50 g, and 1.8 g of PTBP was used instead of POB-C12. The intrinsic viscosity [η] of the obtained polymer was 0.45 dL/g, and as the result of infrared absorption spectrum analysis and others, this polymer was confirmed as a polycarbonate polymer having the following structure unit.

[Chemical formula 25]

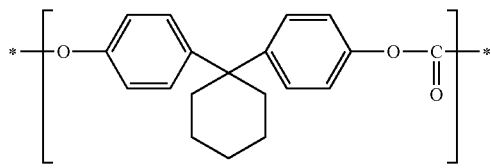

Synthesis Example 5

A polymer was synthesized in the same manner as in Example 1, except that 68.7 g of 9,9-bis(4-hydroxy-3-methylphenyl)fluorene (hereinafter referred to as BCFL) was used instead of BPZ, 103.1 g of [chemical formula 23] was used instead of [chemical formula 18], and the amount of Phosgene was changed to 36 g and the amount of POB-C12 was changed to 4.1 g. The intrinsic viscosity [η] of the obtained polymer was 0.30 dL/g, and as the result of infrared absorption spectrum analysis and others, this polymer was confirmed as a polycarbonate polymer having the following structure unit.

[Chemical formula 26]

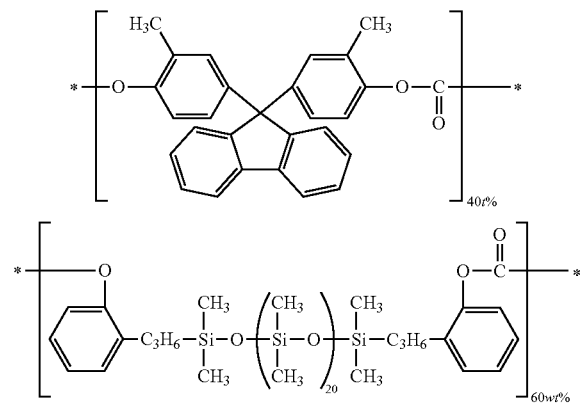

Synthesis Example 6

A polymer was synthesized in the same manner as in Example 1, except that 73.2 g of the polyorganosiloxane compound having the structure of [chemical formula 23] was used instead of [chemical formula 18], and the amount of Phosgene was changed to 32 g and the amount of POB-C12 was changed to 3.7 g. The intrinsic viscosity [η] of the obtained polymer was 0.32 dL/g, and as the result of infrared absorption spectrum analysis and others, this polymer was confirmed as a polycarbonate polymer having the following structure unit.

[Chemical formula 27]

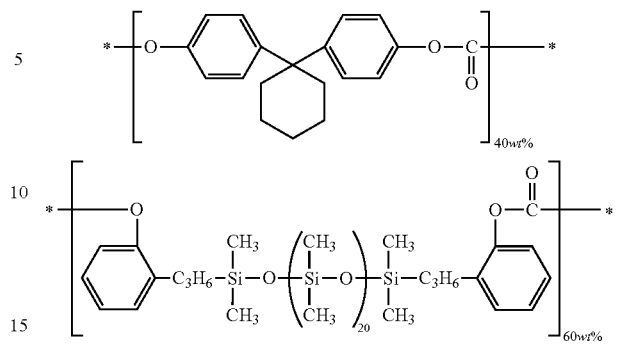

Example

Examples 1 to 3 and Comparative Examples 1 and 2

Pellets shown in Table 1 were placed in a mold (made of brass) for molding into a plate shape in an amount of about 1 g. And then, press molding was conducted at 180° C. to 300° C. for 2 to 3 minutes under 5 to 10 kg/cm² pressure. The obtained plates were subjected to the below evaluations.

<Measurement of Shore D Hardness>

Using Shore D hardness durometer GS-720G available from TECLOCK Corporation, hardness of plates having a thickness of about 5 mm was measured under the environment at 25° C. at 50%.

<Results of Evaluation of Pressed Plate>

From the results in Table 1, it is observed that because the plates obtained by the present invention have low hardness, the plates have excellent flexibility. On the other hand, plates molded by Comparative Examples 1 and 2 have too high hardness for contact lens, thereby less wearing comfortableness can be easily expected.

Examples 1, 2 and 4 and Comparative Examples 1 and 3

Moreover, a 30% tetrahydrofuran (THF) solution was prepared using the pellets shown in Table 1 and solvent-casting films were prepared. The obtained plates were subjected to the below evaluations.

<Property> Feeling of a solvent-casting film having a diameter of 17 mm and a thickness of about 0.4 mm was functionally evaluated by fingers.

⊚: Very flexible

○: Flexible

Δ: Flexible and moderately hard x: Rigid

<Measurement of Light Transmittance (% T)>

A light transmittance of a wave length between 380 to 780 nm of the plate was measured in saline by using a ultraviolet-visible spectrophotometer UV-3150 made by Shimadzu Corporation to calculate a light transmittance in terms of a thickness of 0.15 mm.

<Oxygen Permeability (Dk)>

An oxygen permeability was measured by using a GAS-TO-GAS method with a GTG analyzer made by REHDER DEVELOPMENT Co., Ltd. The measuring unit was $\times 10^{-11}$ (cm²/second)·(mLO₂/(mL·mmHg)).

<Results of Evaluation of Solvent-Casting Film>

From the results in Table 1, it is observed that the solvent-casting films obtained in the present invention are flexible and have high transparency and an excellent Dk value, and thus have a preferable physicality as a contact lens material. On the other hand, while the solvent-casting film of Comparative Example 1 has high transparency, this solvent-casting film is rigid and exhibits a Dk value of 1, which is low. Further, while the solvent-casting films of Comparative Examples 2 and 3 are excellent in transparency and Dk value, they do not exhibit a preferable flexibility as their property.

The composition of pellets used for molding and evaluation results are shown in Table 1 (regarding Example 3 and Comparative Example 3, only solvent-casting films are shown):

TABLE 1

|  | EXAMPLE | | | COMPARATIVE EXAMPLE | | |
| --- | --- | --- | --- | --- | --- | --- |
|  | 1 | 2 | 3 | 1 | 2 | 3 |
| Synthesis Example | 1 | 2 | 3 | 4 | 5 | 6 |
| General formula (A) | A1 | A1 | A1 | A1 | A2 | A1 |
| General formula (B) | B1 (d, e = 7) | B2 (f, g, h, i = 10) | B1 (d, e = 25) | — | — | — |
| General formula (C) | — | — | C1 (l = 20) | — | C1 (l = 20) | C1 (l = 20) |
| Ratio of each component (A:B:C) | 40:60:0 | 50:50:0 | 50:25:25 | 100:0:0 | 40:0:60 | 40:0:60 |
| Press temperature (° C.) | 220 | 180 | — | 300 | 220 | — |
| Shore D hardness | 26 | 24 | — | 84 | 44 | — |
| Property | ◎ | ○ | ○ | x | Δ | Δ |
| % T | 96.9 | 96.3 | 99.1 | 96.3 | 93.2 | 96.7 |
| Dk | 163 | 90 | 122 | 1 | 168 | 106 |

[Chemical formula 28]

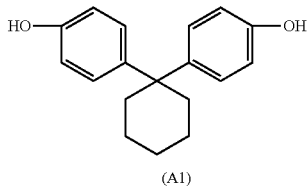

(A1)

[Chemical formula 29]

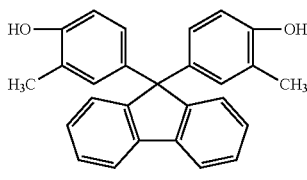

(A2)

[Chemical formula 30]

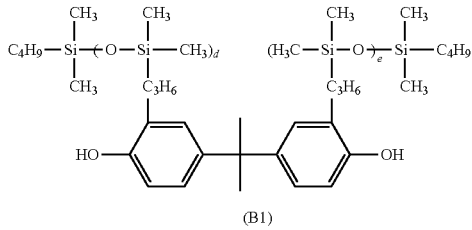

(B1)

[Chemical formula 31]

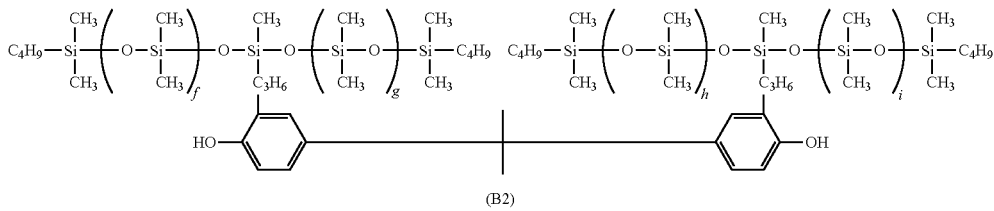

(B2)

[Chemical formula 32]

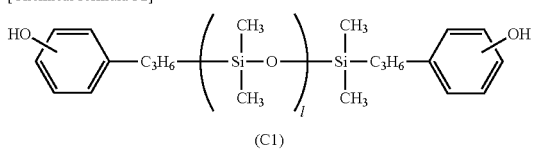

(C1)

Examples 5 to 9 and Comparative Examples 4 and 5

Components shown in Table 2 are injected into a mold in the shape of a plate having a diameter of about 20 mm in an amount of about 100 μl, and then photo polymerization was conducted for 20 minutes by irradiating UV rays to this mold to obtain plates. The resulting polymers were subjected to the below evaluations.

<Measurement of Light Transmittance (% T)>

A light transmittance of a wave length between 380 to 780 nm of the plate was measured in saline by using a ultraviolet-visible spectrophotometer UV-3150 made by Shimadzu Corporation to calculate a light transmittance in terms of a thickness of 0.08 mm.

<Oxygen Permeability (Dk)>

An oxygen permeability of the gel was measured in saline by an electrode method with an oxygen permeation measurement machine K-316 made by Rika Seiki Kogyo K.K.

<Water Content (WC) (%)>

After hydration of the gel, its surface was lightly wiped and the weight was measured (W1: g). The gel was placed in a drier of 105° C. for 16 hours or more, and then taken out from the drier to slowly cool to a room temperature in a desiccator, and the weight of the dried gel was measured (W2: g). The water contents were calculated by the following equation:

$$WC=(W1-W2)/W1$$

<Young's Modulus>

The hydrated gel was processed into a dumbbell shape and a tensile test was conducted using a multi-role tester 4300 made by Instron Co., Ltd., to determine Young's Modulus.

<Evaluation Results of Gel>

From the result in Table 2, it is observed that all the gels obtained by the present invention are transparent and flexible and have excellent Dk value. On the other hand, while the gel of Comparative Example 4 is transparent and the Dk value thereof is high enough, the Young's Modulus thereof is high and less in flexibility. While the gel of Comparative Example 5 has low Young's Modulus and high Dk value, light transmittance thereof is low. Therefore the gels of Comparative Examples cannot be said to be preferable as a contact lens.

The Composition of pellets used for gel and evaluation results are shown in Table 2.

The invention claimed is:

1. A contact lens material comprising a polycarbonate resin derived from a compound represented by a general formula (A), a compound represented by a general formula (B) and a compound forming a carbonic acid ester, wherein the compound represented by the general formula (B) is at least one selected from a compound represented by a general formula (B1) or a compound represented by a general formula (B2);

[Chemical formula 1]

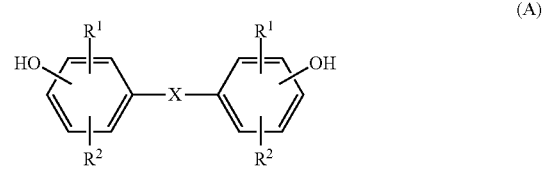

(A)

wherein, each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 2]

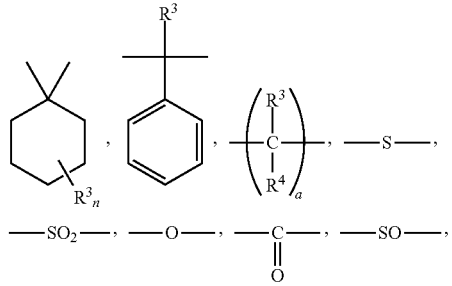

TABLE 2

| | | EXAMPLE | | | | | COMPARATIVE EXAMPLE | |
|---|---|---|---|---|---|---|---|---|
| | | 5 | 6 | 7 | 8 | 9 | 4 | 5 |
| Synthesis Example | | | | 2 | | | 4 | 6 |
| Component of PCSi | General formula A | | | A1 | | | A1 | A1 |
| | General formula B | | B2 (f, g, h, i = 10) | | | | — | — |
| | General formula C | — | | | | | — | C1 (1 = 20) |
| | Ratio of each component (A:B:C) | | | 50:50:0 | | | 100:0:0 | 40:0:60 |
| Blend | PCSi | 30 | 30 | 30 | 30 | 30 | 30 | 30 |
| | NVP | 70 | 70 | 70 | 70 | 65 | 70 | 70 |
| | NMMP | 0 | 0 | 0 | 0 | 5 | 0 | 0 |
| | TRIAM | 0.5 | 0 | 0 | 0.4 | 0.5 | 0.5 | 0.5 |
| | EDMA | 0 | 0.5 | 0 | 0.1 | 0 | 0 | 0 |
| | AMA | 0 | 0 | 0.5 | 0 | 0 | 0 | 0 |
| | D.1173 | 0.5 | 0.5 | 0.5 | 0.5 | 0.5 | 0.5 | 0.5 |
| % T | | 98.8 | 83.8 | 94.9 | 98.1 | 97.9 | 97.9 | 74.9 |
| Dk | | 49 | 52 | 44 | 50 | 49 | 41 | 62 |
| Water Content (%) | | 71 | 73 | 66 | 72 | 70 | 65 | 85 |
| Young's Modulus (MPa) | | 0.61 | 0.68 | 1.49 | 0.70 | 0.79 | 3.95 | 0.10 |

-continued

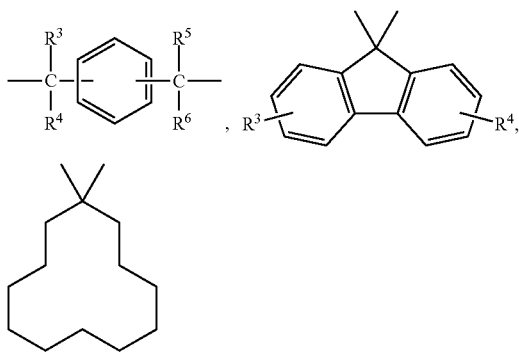
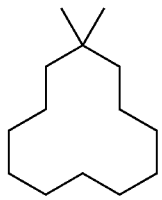

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 3]

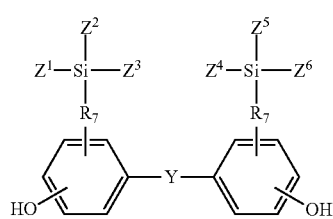

(B)

wherein $R^7$ is an aliphatic group of C1 to C6 or only denotes a bond, Y is a group shown by the formula:

[Chemical formula 4]

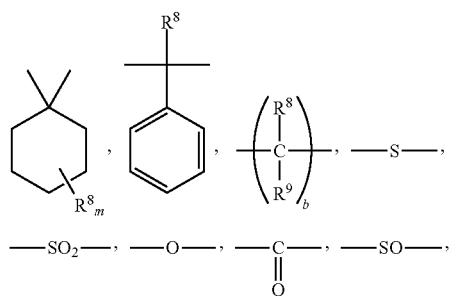
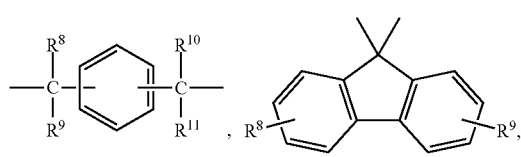

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 5]

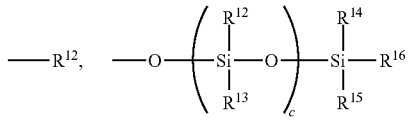

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, c is an integer of 0 to 100;

(B1)

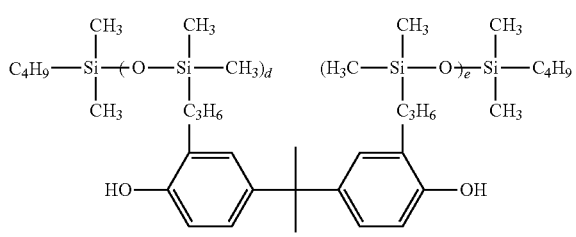

wherein each of d and e is an integer of 7 to 100;

(B2)

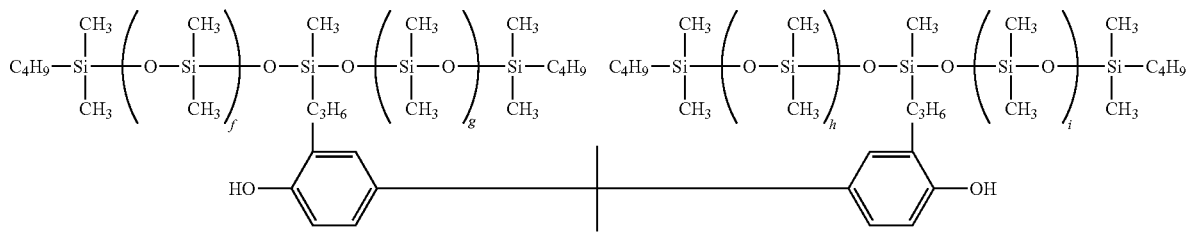

wherein each of f, g, h and i is an integer of 10 to 100.

2. A contact lens material according to claim 1, further comprising a compound represented by a general formula (C);

[Chemical formula 6]

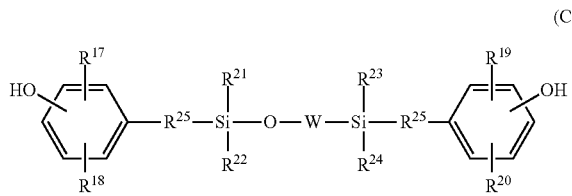

(C)

wherein each of $R^{17}$ to $R^{24}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, $R^{25}$ is an aliphatic group of C1 to C6 or only denotes a bond, W is a homopolymer or a random copolymer of —SiO($R^{26}$)($R^{27}$)— and/or —SiO($R^{28}$)($R^{29}$)— and a degree of polymerization thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5.

3. A contact lens material comprising a transparent gel comprising a polycarbonate resin and a hydrophilic polymer obtained by polymerizing a hydrophilic monomer, wherein the polycarbonate resin is derived from a compound represented by a general formula (A), a compound represented by a general formula (B) and a compound forming a carbonic acid ester, and wherein the transparent gel has an interpenetrating network structure of the resin and the hydrophilic polymer

[Chemical formula 1]

(A)

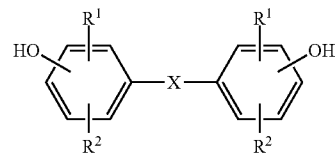

wherein, each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 2]

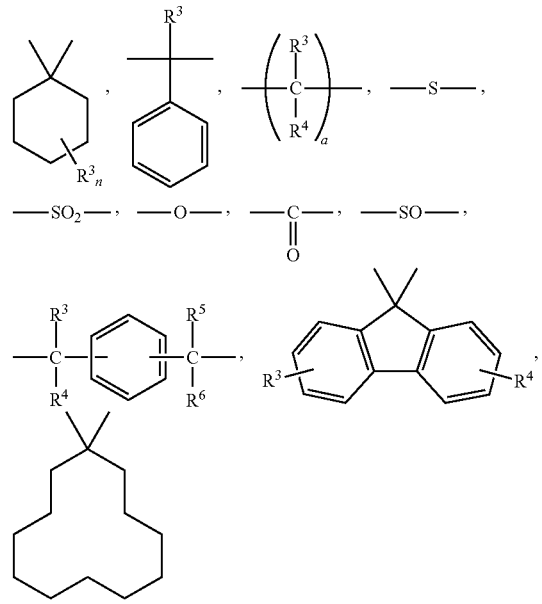

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 3]

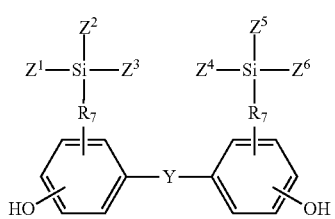

(B)

wherein $R^7$ is an aliphatic group of C1 to C6 or only denotes a bond, Y is a group shown by the formula:

[Chemical formula 4]

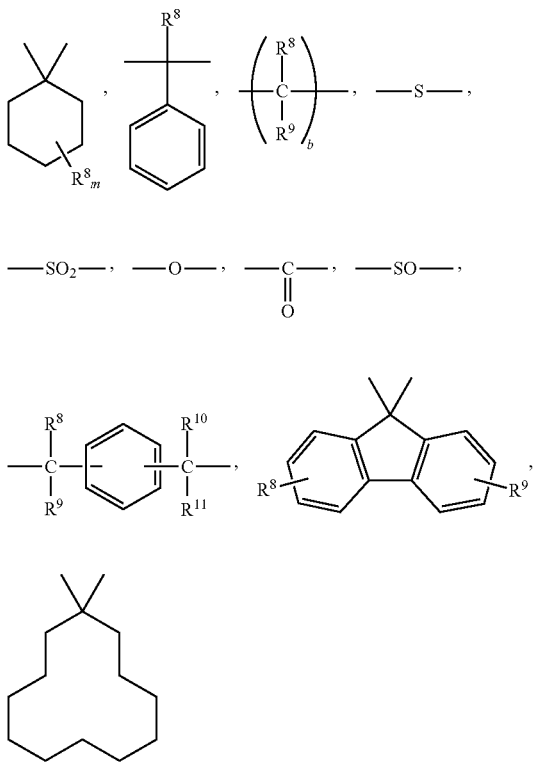

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 5]

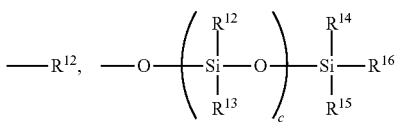

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, c is an integer of 0 to 100.

4. A contact lens material according to claim 3, further comprising a compound represented by a general formula (C).

5. The contact lens material according to claim 1, wherein the compound represented by the general formula (A) is at least one selected from the group consisting of 9,9-bis(4-hydroxyphenyl)fluorene, 9,9-bis(4-hydroxy-3-methylphenyl)fluorene, 9,9-bis(4-hydroxy-2-methylphenyl)fluorene, 2,2-bis(4-hydroxyphenyl)-2-phenylethane, 1,1-bis(4-hydroxyphenyl)cyclohexane, 1,1-bis(4-hydroxy-3-methylphenyl)cyclohexane, 1,1-bis(4-hydroxyphenyl)cyclododecane and 3,3,5-trimethyl-1,1-bis(4-hydroxyphenyl)cyclohexane.

6. The contact lens material according to claim 3, wherein the hydrophilic monomer is a monomer having a nitrogen atom.

7. The contact lens material according to claim 6, wherein the monomer having a nitrogen atom is N-vinyl pyrrolidone, N,N-dimethylacrylamide and/or N-methyl-3-methylidene pyrrolidone.

8. The contact lens material according to claim 1, wherein a ratio of the compound represented by the general formula (A) to the compound represented by the general formula (B) is (A):(B)=25:75 to 75:25 by weight.

9. The contact lens material according to claim 2, wherein a ratio of the compound represented by the general formula (A) to the compounds represented by the general formulas (B) and (C) is (A):(B+C)=25:75 to 75:25 by weight.

10. The contact lens material according to claim 3, wherein a ratio of the polycarbonate resin to the hydrophilic monomer is 5:95 to 40:60 by weight.

11. A method of producing a contact lens material comprising the step of:
reacting a compound represented by the following general formula (A), a compound represented by the following general formula (B), wherein the compound represented by the general formula (B) is at least one selected from a compound represented by a general formula (B1) or a compound represented by a general formula (B2), and a compound forming a carbonic acid ester, to form a polycarbonate resin;

[Chemical formula 9]

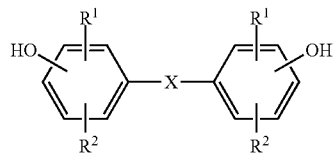
(A)

wherein each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 10]

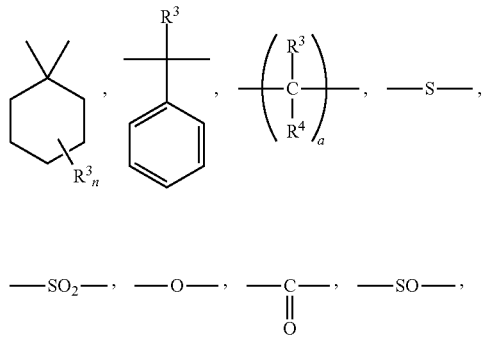

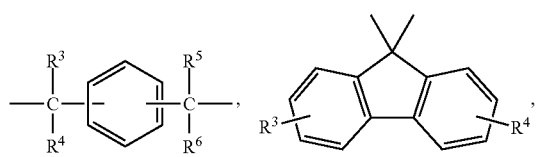

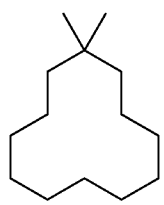

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 11]

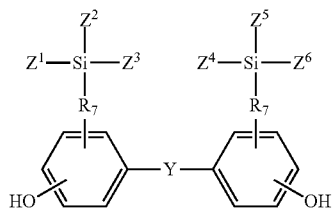
(B)

wherein $R^7$ is an aliphatic group of C1 to C6 or only denotes a bond, Y is a group shown by the formula:

[Chemical formula 12]

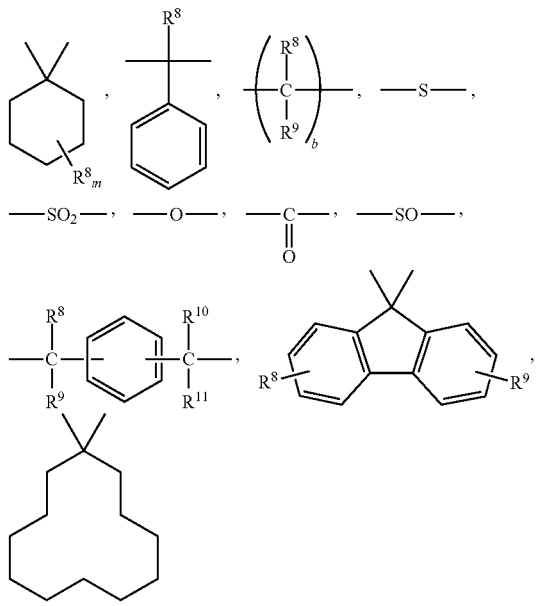

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 13]

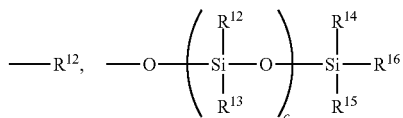

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, c is an integer of 0 to 100:

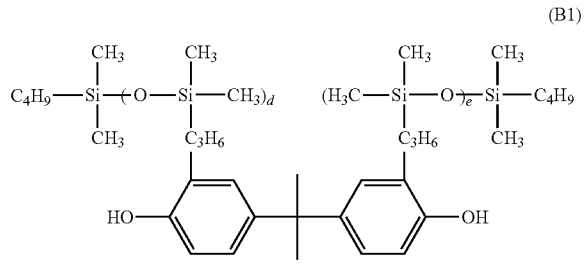
(B1)

wherein each of d and e is an integer of 7 to 100;

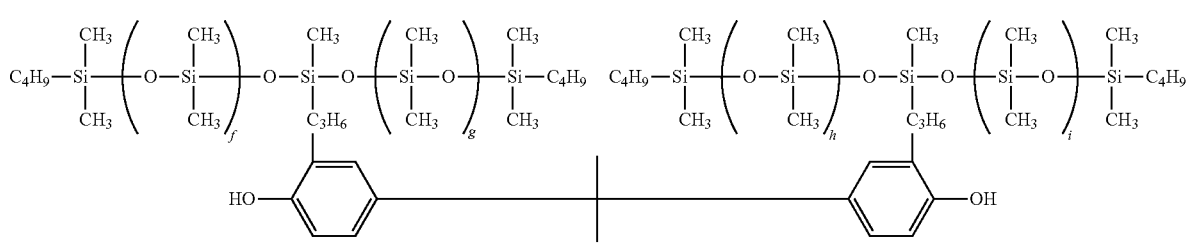
(B2)

wherein each of f, g, h and i is an integer of 10 to 100.

12. A method for producing a contact lens material comprising the step of:
reacting a compound represented by the following general formula (A), a compound represented by the following general formula (B), wherein the compound represented by the general formula (B) is at least one selected from a compound represented by a general formula (B1) or a compound represented by a general formula (B2), a compound represented by the following general formula (C) and a compound forming a carbonic acid ester, to form a polycarbonate resin;

[Chemical formula 14]

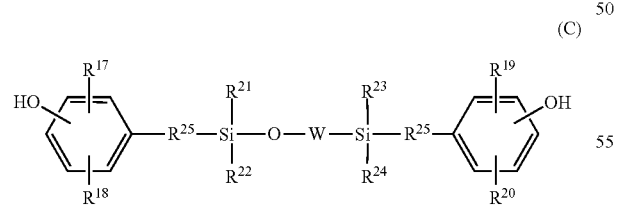
(C)

wherein each of $R^{17}$ to $R^{24}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, $R^{25}$ is an aliphatic group of C1 to C6 or only denotes a bond, W is a homopolymer or a random copolymer of —SiO($R^{26}$)($R^{27}$)— and/or —SiO($R^{28}$)($R^{29}$)— and a degree of polymerization thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5

[Chemical formula 9]

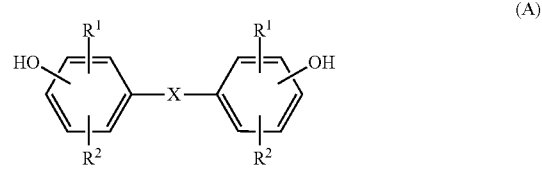
(A)

wherein each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 10]

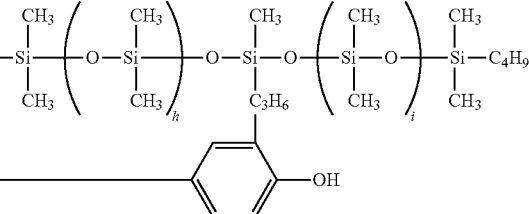

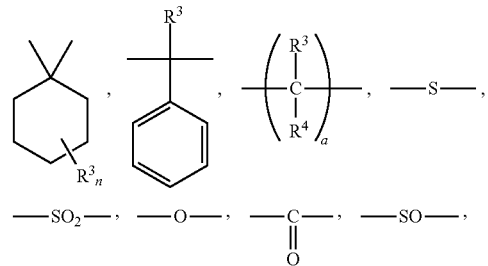

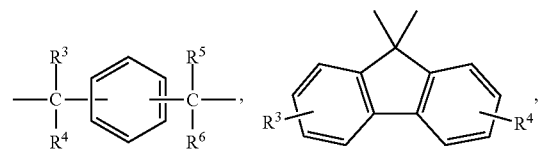

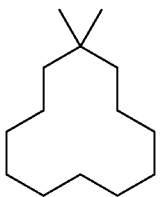

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 11]

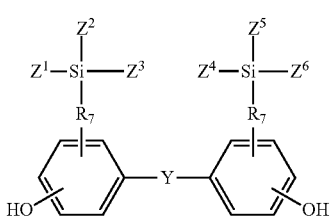

(B)

wherein $R^7$ is an aliphatic group of C1 to C6 or only denotes a bond, Y is a group shown by the formula:

[Chemical formula 12]

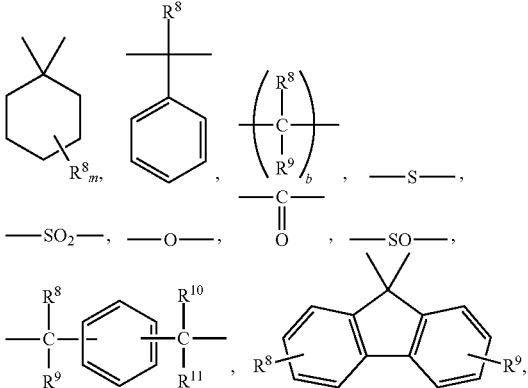

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 13]

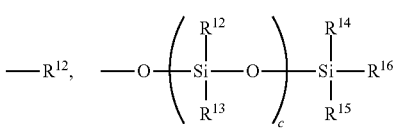

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, c is an integer of 0 to 100;

(B1)

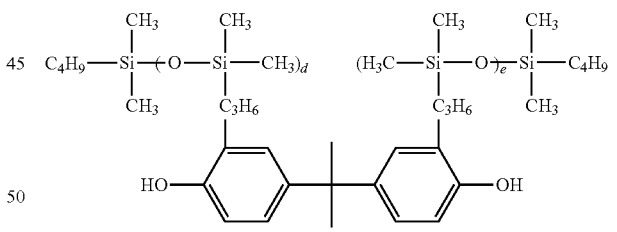

wherein each of d and e is an integer of 7 to 100;

(B2)

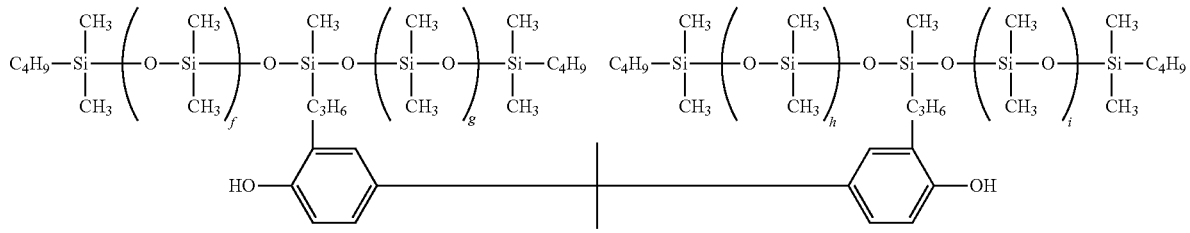

wherein each of f, g, h and i is an integer of 10 to 100.

13. A method for producing a contact lens material comprising a transparent gel comprising the steps of:
reacting a compound represented by the following general formula (A), a compound represented by the following general formula (B) and a compound forming a carbonic acid ester, to form a polycarbonate resin;
mixing the polycarbonate resin with a hydrophilic monomer; and
polymerizing the mixture to produce a transparent gel comprising the polycarbonate resin and a hydrophilic polymer, wherein the transparent gel has an interpenetrating network structure of the resin and the hydrophilic polymer;

[Chemical formula 9]

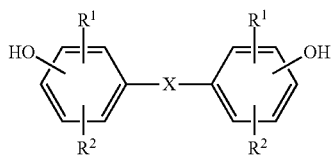

(A)

wherein each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 10]

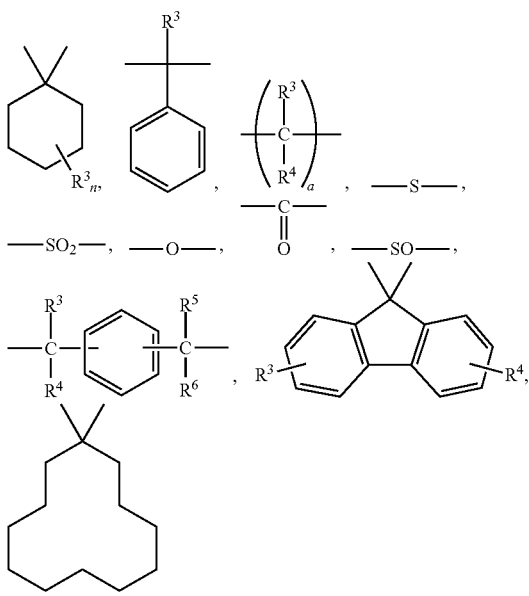

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 11]

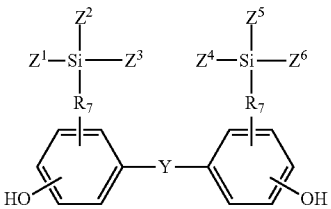

(B)

wherein $R^7$ is an aliphatic group of C1 to C6 or only denotes a bond, Y is a group shown by the formula:

[Chemical formula 12]

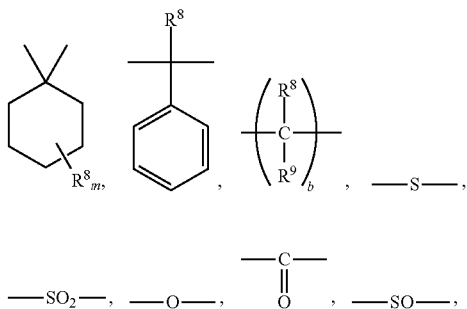

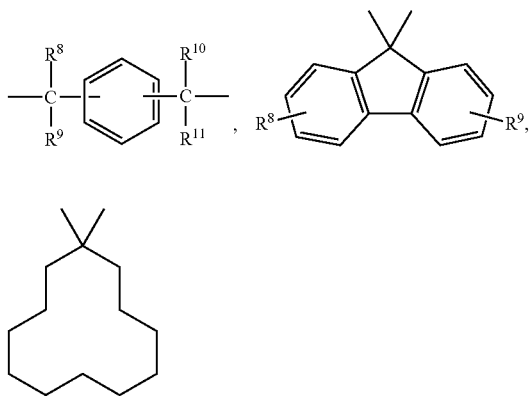

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 13]

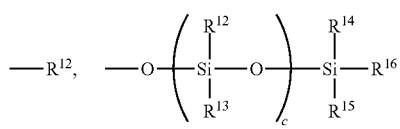

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, c is an integer of 0 to 100.

14. A method for producing a contact lens material comprising a transparent gel comprising the steps of:
reacting a compound represented by the following general formula (A), a compound represented by the following general formula (B), a compound represented by the following general formula (C) and a compound forming a carbonic acid ester, to form a polycarbonate resin;
mixing the polycarbonate resin with a hydrophilic monomer; and
polymerizing the mixture to produce a transparent gel comprising the polycarbonate resin and a hydrophilic polymer, wherein the transparent gel has an interpenetrating network structure of the resin and the hydrophilic polymer;

[Chemical formula 9]

(A)

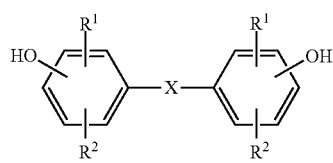

wherein each of $R^1$ and $R^2$ is independently a hydrogen atom or a group selected from the group consisting of an alkyl group of C1 to C10, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, X is a group shown by the formula:

[Chemical formula 10]

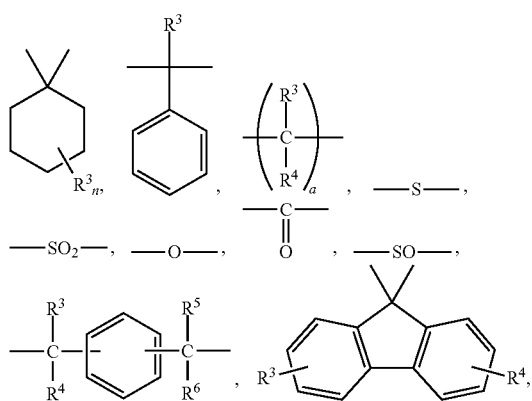

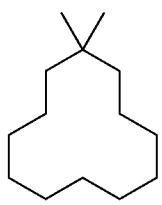

wherein each of $R^3$ and $R^4$ is a hydrogen atom or a group selected from the group consisting of an alkyl group of C1 to C10, an alkenyl group of C2 to C10, an alkoxy group of C1 to C10 and an aryl group of C6 to C12, or $R^3$ and $R^4$ as well as $R^5$ and $R^6$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, a is an integer of 0 to 20, and n is an integer of 0 to 4;

[Chemical formula 11]

(B)

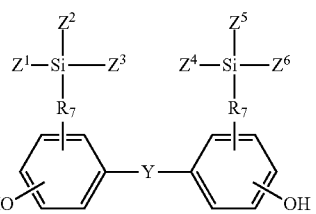

wherein $R^7$ is an aliphatic group of C1 to C6 or only denotes a bond, Y is a group shown by the formula:

[Chemical formula 12]

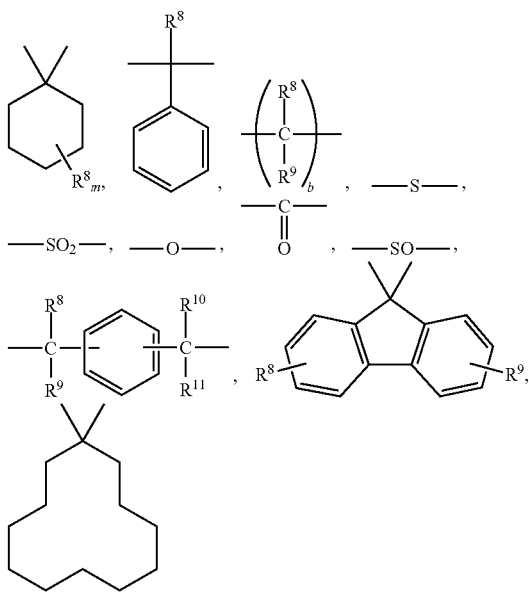

wherein each of $R^8$ and $R^9$ is a hydrogen atom or a group selected from the group consisting of an alkyl group of C1 to C10, an alkenyl group of C2 to C10, an alkoxy group of C1 to C10 and an aryl group of C6 to C12, or $R^8$ and $R^9$ as well as $R^{10}$ and $R^{11}$ are groups to form a carbon ring or a heterocyclic ring by combining with each other respectively, and those groups, when having a carbon atom, may have a substituent selected from the group consisting of an alkyl group of C1 to C5, an alkenyl group of C2 to C5 and an alkoxy group of C1 to C5, b is an integer of 0 to 20, m is an integer of 0 to 4, each of $Z^1$ to $Z^6$ is independently a group selected from the group consisting of

[Chemical formula 13]

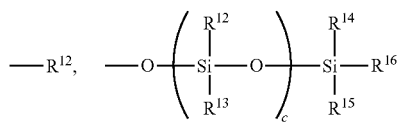

wherein each of $R^{12}$ to $R^{16}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, c is an integer of 0 to 100;

[Chemical formula 14]

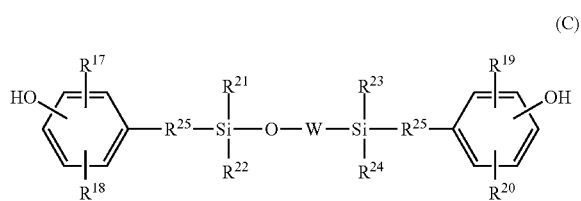

wherein each of $R^{17}$ to $R^{24}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5, $R^{25}$ is an aliphatic group of C1 to C6 or only denotes a bond, W is a homopolymer or a random copolymer of —SiO($R^{26}$)($R^{27}$)— and/or —SiO($R^{28}$)($R^{29}$)— and a degree of polymerization thereof is 0 to 200, and each of $R^{26}$ to $R^{29}$ is independently a hydrogen atom or a group selected from the group consisting of an alkyl group of C1 to C5, an aryl group of C6 to C12, an alkenyl group of C2 to C5, an alkoxy group of C1 to C5 and an aralkyl group of C7 to C17, and those groups, when having a carbon atom, may have a substituent selected from the group consisting of an alkyl group of C1 to C5, an alkenyl group of C2 to C5 and an alkoxy group of C1 to C5.

[Chemical formula 8]

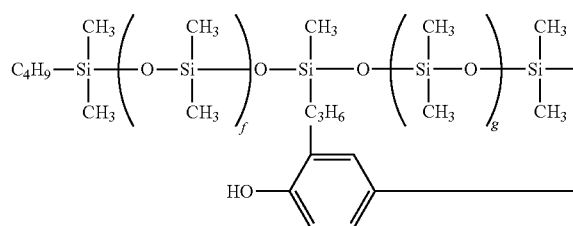

15. The contact lens material according to claim 2, wherein the compound represented by the general formula (A) is at least one selected from the group consisting of 9,9-bis(4-hydroxyphenyl)fluorene, 9,9-bis(4-hydroxy-3-methylphenyl)fluorene, 9,9-bis(4-hydroxy-2-methylphenyl)fluorene, 2,2-bis(4-hydroxyphenyl)-2-phenylethane, 1,1-bis(4-hydroxyphenyl)cyclohexane, 1,1-bis(4-hydroxy-3-methylphenyl)cyclohexane, 1,1-bis(4-hydroxyphenyl)cyclododecane and 3,3,5-trimethyl-1,1-bis(4-hydroxyphenyl)cyclohexane.

16. The contact lens material according to claim 3, wherein the compound represented by the general formula (A) is at least one selected from the group consisting of 9,9-bis(4-hydroxyphenyl)fluorene, 9,9-bis(4-hydroxy-3-methylphenyl)fluorene, 9,9-bis(4-hydroxy-2-methylphenyl)fluorene, 2,2-bis(4-hydroxyphenyl)-2-phenylethane, 1,1-bis(4-hydroxyphenyl)cyclohexane, 1,1-bis(4-hydroxy-3-methylphenyl)cyclohexane, 1,1-bis(4-hydroxyphenyl)cyclododecane and 3,3,5-trimethyl-1,1-bis(4-hydroxyphenyl)cyclohexane.

17. The contact lens material according to claim 4, wherein the compound represented by the general formula (A) is at least one selected from the group consisting of 9,9-bis(4-hydroxyphenyl)fluorene, 9,9-bis(4-hydroxy-3-methylphenyl)fluorene, 9,9-bis(4-hydroxy-2-methylphenyl)fluorene, 2,2-bis(4-hydroxyphenyl)-2-phenylethane, 1,1-bis(4-hydroxyphenyl)cyclohexane, 1,1-bis(4-hydroxy-3-methylphenyl)cyclohexane, 1,1-bis(4-hydroxyphenyl)cyclododecane and 3,3,5-trimethyl-1,1-bis(4-hydroxyphenyl)cyclohexane.

18. The contact lens material according to claim 3, wherein each of $R^{12}$ to $R^{16}$ in the general formula (B) is a methyl group, a phenyl group or a butyl group.

19. The contact lens material according to claim 4, wherein each of $R^{12}$ to $R^{16}$ in the general formula (B) is a methyl group, a phenyl group or a butyl group.

20. The contact lens material according to claim 3, wherein the compound represented by the general formula (B) is at least one selected from a compound represented by a general formula (B1) or a compound represented by a general formula (B2);

[Chemical formula 7]

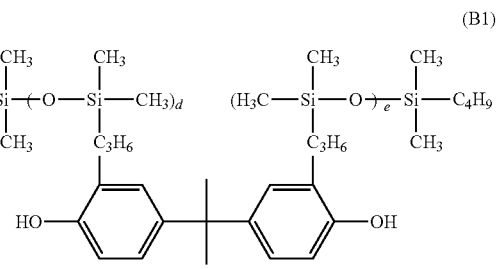

wherein each of d and e is an integer of 0 to 100;

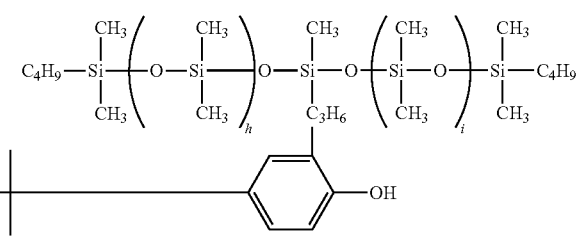

wherein each of f, g, h and i is an integer of 0 to 100.

21. The contact lens material according to claim 4, wherein the compound represented by the general formula (B) is at least one selected from a compound represented by a general formula (B1) or a compound represented by a general formula (B2);

[Chemical formula 7]

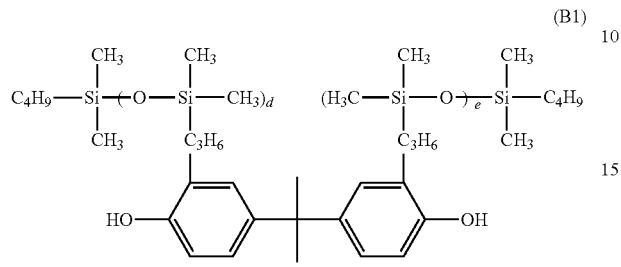

(B1)

wherein each of d and e is an integer of 0 to 100;

[Chemical formula 8]

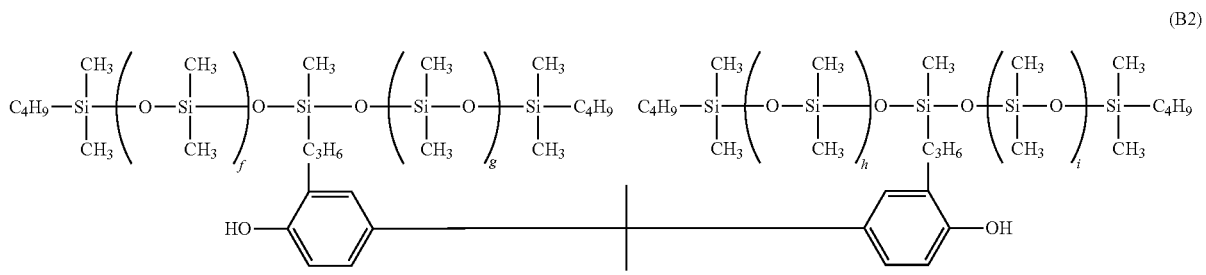

(B2)

wherein each of f, g, h and i is an integer of 0 to 100.

22. The contact lens material according to claim 4, wherein the hydrophilic monomer is a monomer having a nitrogen atom.

23. The contact lens material according to claim 22, wherein the monomer having a nitrogen atom is N-vinyl pyrrolidone, N,N-dimethylacrylamide and/or N-methyl-3-methylidene pyrrolidone.

24. The contact lens material according to claim 3, wherein a ratio of the compound represented by the general formula (A) to the compound represented by the general formula (B) is (A):(B)=25:75 to 75:25 by weight.

25. The contact lens material according to claim 4, wherein a ratio of the compound represented by the general formula (A) to the compounds represented by the general formulas (B) and (C) is (A):(B+C)=25:75 to 75:25 by weight.

26. The contact lens material according to claim 4, wherein a ratio of the polycarbonate resin to the hydrophilic monomer is 5:95 to 40:60 by weight.

* * * * *